Aug. 10, 1943.  W. A. SEMERAK  2,326,571
OUTSIDE MICROMETER
Filed March 10, 1942
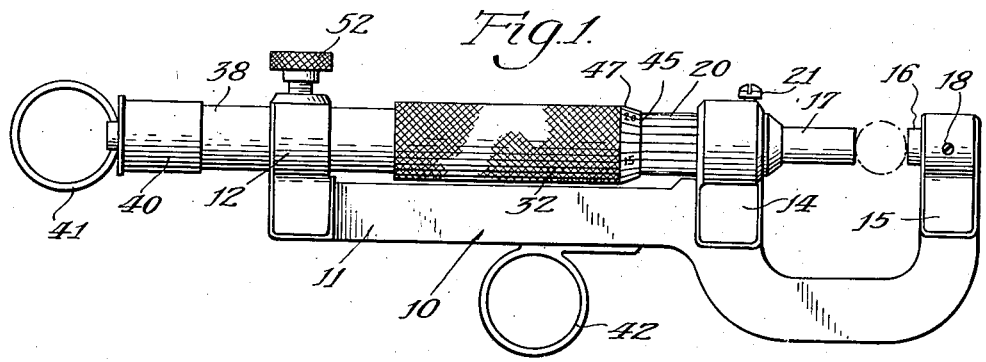
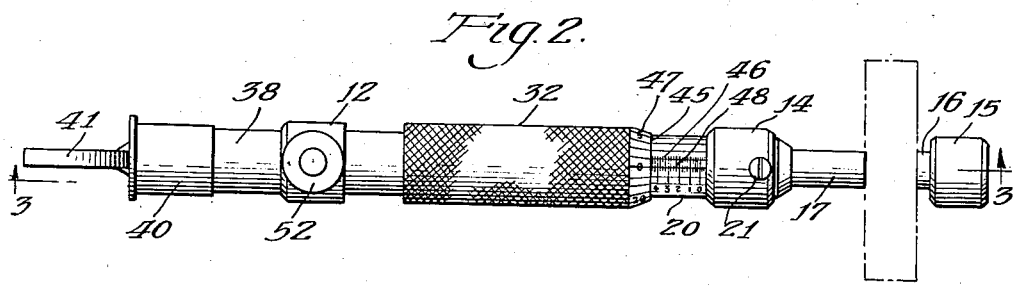
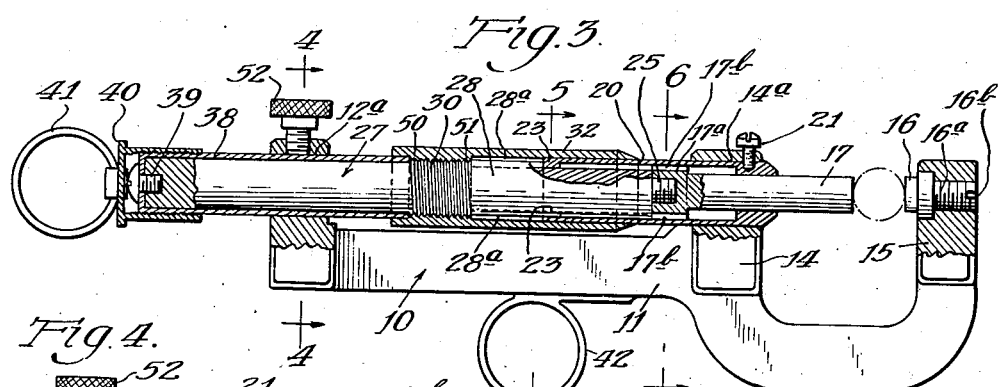
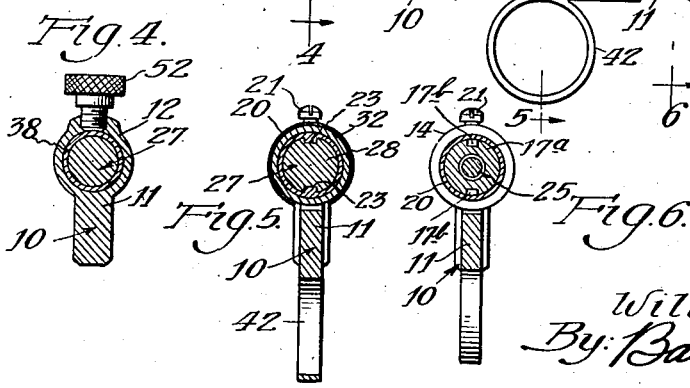
Inventor:
William A. Semerak,
By Bair & Freeman
Attorneys Patented Aug. 10, 1943

2,326,571

UNITED STATES PATENT OFFICE 2,326,571

OUTSIDE MICROMETER

William A. Semerak, Chicago, Ill.

Application March 10, 1942, Serial No. 434,082

6 Claims. (Cl. 33—143)

This invention relates to improvements in micrometer instruments of the type for accurately measuring the external parts of an object.

Due to present-day mass production of various articles, and due to the high-precision requirements in the manufacture of such articles, considerable time is expended in testing and checking the sizes of parts of objects or articles of various kinds and nature. While such checking and testing operations are often quite essential, yet it can be appreciated that such operations are rather costly, due to time consumed in utilizing the present types of instruments of this general class.

It is, therefore, one of the objects of this invention to provide a novel and improved form of micrometer of the character indicated, by virtue of which the calibration of objects may be made in a quick and easy manner.

Another object is to provide an improved instrument of the character indicated, by virtue of which an instantaneous approximate measurement may be made incident to engagement of the object between the pair of cooperating measuring pins of the instrument.

A further object is to provide an improved measuring device of the character indicated which is constructed and arranged so as to permit of rapid manipulation of parts to obtain an instantaneous approximate measurement of external parts of an object, and which in addition is also provided with manually adjustable means to permit rapidly obtaining a relatively exact measurement of said parts of said object.

Still another object is to provide an instrument of the character indicated which is composed of relatively few parts of simplified construction, which is durable in use and which is capable of being economically manufactured.

Other objects and advantages of this invention will be apparent from the following description taken in connection with the accompanying drawing, in which:

Figure 1 is a view in side elevation of the novel micrometer instrument embodying the present invention, with parts shown in an adjusted position for measuring an object;

Figure 2 is a plan elevational view thereof;

Figure 3 is a vertical sectional view through the operating portions of the instrument, taken substantially as indicated at line 3—3 on Figure 2;

Figures 4, 5 and 6 are transverse vertical sectional views through the instrument, taken substantially as indicated at lines 4—4, 5—5 and 6—6, respectively, on Figure 3.

Referring now to the drawing, the micrometer embodying the present invention includes a main frame 10, comprising a horizontally extending bar 11 terminating at one end in an upstanding leg 12, and at its opposite end in a U-shaped portion including legs 14 and 15. The upper portions of the legs 12 and 14 of the frame are formed to provide a pair of axially aligned bores, as indicated at 12a and 14a, respectively.

A pair of cooperating measuring pins 16 and 17 are carried in the upper ends of said legs 14 and 15 of the U-shaped portion of the frame, the pin 16 being fixedly mounted, while the pin 17 is movable toward and away from said fixed pin 16, as will hereinafter be described. The pin 16 includes a threaded shank portion 16a threaded into the upper end of the arm 15, and formed at its outer end with a slot 16b, for receiving a suitable tool or instrument. The purpose of the threading engagement of the pin 16 is to obtain nicety of adjustment of the instrument and to facilitate correction of slight misalignment of parts. Said pin 16 is fixedly secured in the upright leg 15 of the U-shaped portion of the frame by means of a set screw 18.

A stationary tubular element 20 is rigidly supported and anchored at its forward end in the bore 14a of the leg 14 by means of a set screw 21. The forward end of the tubular element 20 is formed to provide a bearing for the movable measuring pin 17, which is adapted to be moved axially toward and away from its cooperating pin 16.

The measuring pin 17, at its inner end, within the tubular element 20, is formed with an enlargement as indicated at 17a for a snug, guided fit with the internal bore of said tubular element 20. The rear end of the tubular element 20 is formed with a pair of diametrically opposite inwardly extending lugs or keys 23, for purposes as will hereinafter be described. In order to insert the measuring pin 17 into position in the tubular element, the enlarged portion 17a is provided with a pair of diametrically opposite slots 17b for sliding engagement over the keys 23 at the rear end of said tubular element.

The rear end of the pin 17, within the tubular element 20, is threaded for receiving a threaded stud 25 formed on the forward end of a main operating member 27, which is generally in the form of a rod or shaft. The forward portion of said member 27, as indicated at 28, is formed with a pair of diametrically opposite slots 28a for registration with and for sliding, guided engagement on the keys 23 formed in the stationary tubular element 20, so as to permit axial non-rotative, telescopic movement of the member 27 relatively to the stationary element 20, for shifting of the measuring pin 17 toward and away from its cooperating fixed pin 16.

A portion of the main operating member 27 rearwardly of said portion 28 is threaded, as indicated at 30, on which is threaded a manually operable sleeve 32, which is adapted for telescopic movement over the stationary tubular element 20, as seen in the drawing.

The rear end portion of the main operating member 27 is enclosed in a cap sleeve 38, rigidly secured in position thereon by a screw 39, and threaded on the outer end of the cap sleeve 38 is a fixture 40 including a finger grip 41, in the nature of a loop. A cooperating and similarly formed finger grip 42 is secured to the under side of the horizontal member 11 of the frame structure 10.

The rear end portion of operating member 27, is guided and supported by the cap sleeve 38 which is slidably mounted in the bore 12a of the rear upstanding leg 12 of the frame. It will now be apparent that the finger pieces 41 and 42 may be conveniently engaged for readily shifting the main operating element 27, with its sleeve 32 and movable measuring pin 17, in axial direction and in telescopic relation to the stationary tubular element 20 for moving the measuring pin 17 toward or away from the cooperating fixed measuring pin 16 incident to engaging an object between the ends of said pins for calibrating the same.

When the measuring pins 16 and 17 are in engagement with each other, the forward knifelike edge, indicated at 45 on the rotatable sleeve 32, is adapted to align with the zero graduation of the graduated scale 46 provided on the stationary tubular element, as seen in Figure 2 of the drawing. The knifelike edge 45 thus in effect becomes an index feature or character adapted to be utilized in the reading of the graduations of the scale 46 in calibrating an object. The forward end portion of the rotatable sleeve 32 is beveled and is provided with a circumferential series of linear graduations to form a scale 47, adapted to be registered with a linear index character 48 on the forward portion of the stationary tubular element 20, and which for convenience traverses the graduations of the scale 46.

In order to obtain an instantaneous calibration of an article, it is merely necessary to insert the object or article between the ends of the measuring pins 16 and 17. Then, by shifting the main operating structure, by application of pressure to the outer end thereof by the finger piece 41, the pin 17 is then moved against the article to cause the ends of the pins 16 and 17 to embrace the article therebetween; and then, by observing the location of the index feature 45 with respect to the graduated scale 46, an approximate, instantaneous reading may be made.

If it is desired to obtain an exact measurement, then the sleeve 32 may be rotated so as to dispose the index feature 45, constituting the knifelike edge of said sleeve 32, until it is in registration with the next adjacent graduation of the scale 46, at which time a reading may be made on the scale 47, with the assistance of index 48, and the amount indicated by scale 47 may be added to or subtracted from the reading made on the scale 46, depending upon the direction in which the sleeve 32 was rotated.

The sleeve 32 may be rotated, preferably, only through one single revolution, and for this purpose the threaded connection between the part 30 of the main operating member 27 and the rotatable sleeve 32 may be such that one complete rotation of the sleeve 32 moves the sleeve axially an amount equivalent to the space between two adjacent graduations of the scale 46. For example, we may assume that the spacing of the graduations constituting the scale 46 are equivalent to $25/1000$ths, and accordingly the scale 47 on the movable sleeve 32 may be divided up into twenty-five spaces, so that the total of the graduations on the scale 47 equals $25/1000$ths, or the distance between two adjacent graduations of the scale 46. Thus, in measuring an object between the pins 16 and 17, it may be that the index feature or knife edge 45 of the sleeve 32 aligns intermediate a pair of graduations of the scale 46. Then, to determine the exact measurement of the object, the rotatable sleeve 32 is rotated until the index feature 45 is in registration with the next adjacent graduation of the scale 46, and then reading of the scale 47 with respect to the index feature 48 and adding the reading of the scale 47 to the reading of the scale 46. For convenience in the use of the instrument, it is of course desirable that the sleeve 32 be adjusted so that the zero or starting point of the scale 47 is in alignment with the index feature 48 on the sleeve 20.

As may be seen in Figure 3 of the drawing, the inner end of the cap sleeve 38 telescopes into a recess formed in the adjacent end of the rotatable sleeve 32, with the end of the sleeve indicated at 50 constituting an abutment shoulder or stop, which serves to limit the rotation of the sleeve 32 in one direction. The shoulder portion indicated at 51, at the juncture of the body portion 28 and the threaded portion 30 of the main operating member 27, constitutes an abutment shoulder or stop for limiting rotation of the sleeve 32 in the opposite direction when the sleeve completes a single revolution.

It is to be understood that any other suitable means may be provided for positively limiting rotation of the sleeve 32 to a single rotation with respect to the main operating member 27 and the stationary tubular element 20.

To facilitate reading of the instrument after the movable pin 17 is shifted by pressure exerted through the finger piece 41, so that the measuring pins 16 and 17 embrace the object to be measured, the movable structure of the instrument may be fixedly positioned with respect to the frame 10 by means of a set screw 52 threaded in the top of the upright leg 12 of the frame and engaging the cap sleeve 38. By virtue of this arrangement, the instrument can be conveniently manipulated, or even, if desired, removed from the object being measured, and then a final, exact determination may be made by proper rotation and adjustment of the rotatable sleeve 32 in a manner as above stated. It will also be apparent that the amount of movement of pin 17 away from fixed pin 16 is limited upon rearward movement of the main operating member, by encounter of the rear end of sleeve 32 with the upright leg 12 of the frame 10.

It will now be manifest that the novel micrometer structure embodying the present invention is of relatively simple form, composed of a relatively few parts of simplified construction, which permit of economical manufacture.

Although I have herein shown and described one preferred embodiment of my invention, manifestly it is capable of modification and rearrangement of parts without departing from the spirit and scope thereof. I do not, therefore, wish to be understood as limiting this invention to the precise form herein disclosed, except as it may be so limited in the appended claims.

I claim as my invention:

1. In a micrometer, a frame including a U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, and a sleeve carried by and movable with said body structure and disposed in telescopic relation to said tubular element, said sleeve having threaded connection to said body structure for rotative adjustment thereon, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features permits obtaining relatively exact calibraton of the object.

2. In a micrometer, a frame including a U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, and a sleeve carried by and movable with said body structure and arranged for telescoping over said tubular element, said sleeve having threaded connection to said body structure for rotative adjustment thereon, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features, permits obtaining relatively exact calibration of the object.

3. In a micrometer, a frame including a U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, said tubular element and body structure being provided with interengaging features to preclude rotation of the latter within said tubular elements, and a sleeve carried by and movable with said body structure and disposed in telescopic relation to said tubular element, said sleeve having threaded connection to said body structure for rotative adjustment thereon, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features permits obtaining relatively exact calibration of the object.

4. In a micrometer, a frame including a U-shaped portion and an upstanding leg, remote from the U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, the rear end portion of said main body structure being slidably supported in said upstanding leg of the frame, and a sleeve carried by and movable with said body structure and disposed in telescopic relation to said tubular element, said sleeve having threaded connection to said body structure for rotative adjustment thereon, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features permits obtaining relatively exact calibration of the object.

5. In a micrometer, a frame including a U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, a sleeve carried by and movable with said body structure and disposed in telescopic relation to said tubular element, said sleeve having threaded connection to said body structure for rotative adjustment thereon, and means for limiting rotation of said sleeve, realtively to said tubular element, to one revolution, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features permits obtaining relatively exact calibration of the object.

6. In a micrometer, a frame including a U-shaped portion and an upstanding leg, remote from the U-shaped portion, a pair of cooperating measuring pins carried by the respective arms of said U-shaped portion, one of said pins being fixed and the other being movable toward and away from the fixed pin, a tubular element fixedly mounted on said frame in substantially central alignment with said movable pin, a main operating body structure mounted and supported at its forward end for axial movement in said tubular element and operably connected at the forward end to said other measuring pin, the rear end portion of said main body structure being slidably supported in said upstanding leg of the frame, a sleeve carried by and movable with said body structure and disposed in telescopic relation to said tubular element, said sleeve having threaded connection to said body structure for rotative adjustment thereon, said sleeve and tubular element being provided with cooperating graduated scale and index features, whereby said main operating structure and sleeve together with said other pin may be freely shifted, in axial direction as a unit, to embrace an object between said pins and permit obtaining an instantaneous rough calibration of the object, said sleeve and tubular element being provided with a second set of cooperating graduated scale and index features, which together with the first mentioned set of said features permits obtaining relatively exact calibration of the object, and a pair of cooperating finger grips carried respectively on the underside of said frame and on the rear end of said main operating body for conveniently shifting said body axially in the tubular element.

WILLIAM A. SEMERAK.